United States Patent
Zhao et al.

(10) Patent No.: US 11,148,950 B2
(45) Date of Patent: Oct. 19, 2021

(54) REINFORCED COMPOSITES, METHODS OF MANUFACTURE, AND ARTICLES THEREFROM

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 619 days.

(21) Appl. No.: 15/945,856

(22) Filed: Apr. 5, 2018

(65) Prior Publication Data

US 2018/0229469 A1 Aug. 16, 2018

Related U.S. Application Data

(62) Division of application No. 14/540,177, filed on Nov. 13, 2014, now Pat. No. 9,962,903.

(51) Int. Cl.
*B32B 5/02* (2006.01)
*B32B 18/00* (2006.01)
(Continued)

(52) U.S. Cl.
CPC .............. *C01B 32/20* (2017.08); *B32B 5/02* (2013.01); *B32B 5/022* (2013.01); *B32B 5/024* (2013.01);
(Continued)

(58) Field of Classification Search
CPC ........................... B32B 9/04; B32B 2260/023
See application file for complete search history.

(56) References Cited

U.S. PATENT DOCUMENTS 3,361,561 A 1/1968 Pinter
3,521,853 A 7/1970 Gillis et al.
(Continued)

FOREIGN PATENT DOCUMENTS

CA 2429780 A1 12/2003
CN 87207110 U 1/1988
(Continued)

OTHER PUBLICATIONS

Baxter et al., "Microstructure and solid particle erosion of carbon-based materials used for the protection of highly porous carbon-carbon composite thermal insulation", Journal of Materials Science, vol. 32, 1997, pp. 4485-4492.
(Continued)

*Primary Examiner* — Laura A Auer
(74) *Attorney, Agent, or Firm* — Cantor Colburn LLP

(57) ABSTRACT

A reinforced composite comprises: a reinforcement material comprising one or more of the following: a carbon fiber based reinforcing material; a fiberglass based reinforcing material; a metal based reinforcing material; or a ceramic based reinforcing material; and a carbon composite; wherein the carbon composite comprises carbon and a binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

19 Claims, 5 Drawing Sheets

(51) Int. Cl.

| | |
|---|---|
| *C01B 32/20* | (2017.01) |
| *C04B 35/536* | (2006.01) |
| *C04B 35/645* | (2006.01) |
| *C04B 35/76* | (2006.01) |
| *C04B 35/82* | (2006.01) |
| *C04B 35/83* | (2006.01) |
| *C04B 35/626* | (2006.01) |
| *C04B 35/63* | (2006.01) |
| *C04B 35/80* | (2006.01) |
| *C22C 49/14* | (2006.01) |
| *B32B 19/00* | (2006.01) |
| *C22C 47/20* | (2006.01) |
| *B32B 7/04* | (2019.01) |
| *B32B 9/04* | (2006.01) |
| *B32B 5/16* | (2006.01) |
| *B32B 9/00* | (2006.01) |
| *B32B 5/08* | (2006.01) |
| *B29C 70/30* | (2006.01) |

(52) U.S. Cl.
CPC ............... *B32B 5/08* (2013.01); *B32B 5/16* (2013.01); *B32B 7/04* (2013.01); *B32B 9/007* (2013.01); *B32B 9/047* (2013.01); *B32B 18/00* (2013.01); *B32B 19/00* (2013.01); *C04B 35/536* (2013.01); *C04B 35/6262* (2013.01); *C04B 35/6303* (2013.01); *C04B 35/6316* (2013.01); *C04B 35/645* (2013.01); *C04B 35/76* (2013.01); *C04B 35/80* (2013.01); *C04B 35/82* (2013.01); *C04B 35/83* (2013.01); *C22C 47/20* (2013.01); *C22C 49/14* (2013.01); *B29C 70/30* (2013.01); *B32B 2250/42* (2013.01); *B32B 2260/023* (2013.01); *B32B 2262/101* (2013.01); *B32B 2262/103* (2013.01); *B32B 2262/105* (2013.01); *B32B 2262/106* (2013.01); *B32B 2264/105* (2013.01); *B32B 2264/108* (2013.01); *B32B 2307/306* (2013.01); *B32B 2307/50* (2013.01); *B32B 2307/54* (2013.01); *B32B 2307/546* (2013.01); *B32B 2307/714* (2013.01); *B32B 2307/732* (2013.01); *B32B 2457/00* (2013.01); *B32B 2605/08* (2013.01); *B32B 2605/12* (2013.01); *B32B 2605/18* (2013.01); *C04B 2235/349* (2013.01); *C04B 2235/3418* (2013.01); *C04B 2235/3481* (2013.01); *C04B 2235/386* (2013.01); *C04B 2235/3826* (2013.01); *C04B 2235/3873* (2013.01); *C04B 2235/424* (2013.01); *C04B 2235/5248* (2013.01); *C04B 2235/5292* (2013.01); *C04B 2235/5436* (2013.01); *C04B 2235/666* (2013.01); *C04B 2235/667* (2013.01); *C04B 2237/385* (2013.01); *Y10T 428/2495* (2015.01); *Y10T 428/24967* (2015.01)

(56) References Cited

U.S. PATENT DOCUMENTS

| | | |
|---|---|---|
| 3,807,996 A | 4/1974 | Sarah |
| 3,904,405 A | 9/1975 | Russell et al. |
| 3,956,568 A | 5/1976 | Kanemaru et al. |
| 3,967,935 A | 7/1976 | Frehn |
| 3,981,427 A | 9/1976 | Brookes |
| 4,116,451 A | 9/1978 | Nixon et al. |
| 4,205,858 A | 6/1980 | Shimazaki et al. |
| 4,223,075 A | 9/1980 | Harrigan et al. |
| 4,234,638 A | 11/1980 | Yamazoe et al. |
| 4,269,391 A | 5/1981 | Saito et al. |
| 4,270,569 A | 6/1981 | Reay et al. |
| 4,358,506 A | 11/1982 | Intrater et al. |
| 4,372,393 A | 2/1983 | Baker |
| 4,383,970 A | 5/1983 | Komuro et al. |
| 4,426,086 A | 1/1984 | Fournie et al. |
| 4,567,103 A | 1/1986 | Sara |
| 4,582,751 A | 4/1986 | Vasilos et al. |
| 4,654,242 A | 3/1987 | Schieber |
| 4,732,364 A | 3/1988 | Seger et al. |
| 4,743,033 A | 5/1988 | Guess |
| 4,798,771 A | 1/1989 | Vogel |
| 4,799,956 A | 1/1989 | Vogel |
| 4,826,181 A | 5/1989 | Howard |
| 4,885,218 A | 12/1989 | Andou et al. |
| 4,929,513 A | 5/1990 | Kyono et al. |
| 5,117,913 A | 6/1992 | Thernig |
| 5,134,030 A | 7/1992 | Ueda et al. |
| 5,195,583 A | 3/1993 | Toon et al. |
| 5,201,532 A | 4/1993 | Salesky et al. |
| 5,225,379 A | 7/1993 | Howard |
| 5,228,701 A | 7/1993 | Greinke et al. |
| 5,247,005 A | 9/1993 | Von Bonin et al. |
| 5,257,603 A | 11/1993 | Bauer et al. |
| 5,283,121 A | 2/1994 | Bordner |
| 5,286,574 A | 2/1994 | Foster et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,509,555 A | 4/1996 | Chiang et al. |
| 5,522,603 A | 6/1996 | Naitou et al. |
| 5,730,444 A | 3/1998 | Notter |
| 5,765,838 A | 6/1998 | Ueda et al. |
| 5,791,657 A | 8/1998 | Cain et al. |
| 5,968,653 A | 10/1999 | Coppella et al. |
| 5,988,202 A | 11/1999 | Spitzer et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richy, III |
| 6,152,453 A | 11/2000 | Kashima et al. |
| 6,161,838 A | 12/2000 | Balsells |
| 6,182,974 B1 | 2/2001 | Harrelson |
| 6,183,667 B1 | 2/2001 | Kubo et al. |
| 6,234,490 B1 | 5/2001 | Champlin |
| 6,258,457 B1 | 7/2001 | Ottinger et al. |
| 6,273,431 B1 | 8/2001 | Webb |
| 6,355,206 B1* | 3/2002 | Hanzawa ............... C04B 35/573 266/239 |
| 6,383,656 B1 | 5/2002 | Kimura et al. |
| 6,506,482 B1 | 1/2003 | Burton et al. |
| 6,585,053 B2 | 7/2003 | Coon et al. |
| 6,789,634 B1 | 9/2004 | Denton |
| 6,880,639 B2 | 4/2005 | Rhodes et al. |
| 6,933,531 B1 | 8/2005 | Ishikawa et al. |
| 7,105,115 B2 | 9/2006 | Shin |
| 7,132,077 B2 | 11/2006 | Norville et al. |
| 7,138,190 B2 | 11/2006 | Bauer et al. |
| 7,470,468 B2 | 12/2008 | Mercuri et al. |
| 7,666,469 B2 | 2/2010 | Weintritt et al. |
| 7,758,783 B2 | 7/2010 | Shi et al. |
| 8,272,816 B2 | 9/2012 | Mirchandani |
| 8,889,062 B2 | 11/2014 | Inoue et al. |
| 9,325,012 B1 | 4/2016 | Xu et al. |
| 9,822,894 B2 | 11/2017 | Bayyouk et al. |
| 2001/0003389 A1 | 6/2001 | Pippert |
| 2001/0039966 A1 | 11/2001 | Walpole et al. |
| 2002/0114952 A1 | 8/2002 | Ottinger et al. |
| 2003/0024611 A1 | 2/2003 | Cornie et al. |
| 2003/0137112 A1 | 7/2003 | Richter et al. |
| 2004/0026085 A1 | 2/2004 | Vacik et al. |
| 2004/0097360 A1 | 5/2004 | Benitsch et al. |
| 2004/0121152 A1 | 6/2004 | Toas |
| 2004/0127621 A1 | 7/2004 | Drzal et al. |

(56) References Cited

U.S. PATENT DOCUMENTS

| | | |
|---|---|---|
| 2004/0155382 A1 | 8/2004 | Huang et al. |
| 2004/0186201 A1 | 9/2004 | Stoffer et al. |
| 2004/0247931 A1 | 12/2004 | Weihs et al. |
| 2005/0019114 A1 | 1/2005 | Sung |
| 2005/0166987 A1 | 8/2005 | Matsubara et al. |
| 2006/0042801 A1 | 3/2006 | Hackworth et al. |
| 2006/0067252 A1 | 3/2006 | John et al. |
| 2006/0106152 A1* | 5/2006 | Metzinger ............... F16C 33/16 524/495 |
| 2006/0220320 A1 | 10/2006 | Potier et al. |
| 2006/0241237 A1 | 10/2006 | Drzal et al. |
| 2006/0249917 A1 | 11/2006 | Kosty |
| 2006/0272321 A1 | 12/2006 | Mockenhaupt et al. |
| 2007/0009725 A1 | 1/2007 | Noguchi et al. |
| 2007/0054121 A1 | 3/2007 | Vveintritt et al. |
| 2007/0243407 A1 | 10/2007 | Delannay et al. |
| 2007/0257405 A1 | 11/2007 | Freyer |
| 2008/0128067 A1 | 6/2008 | Sayir et al. |
| 2008/0152577 A1 | 6/2008 | Addiego et al. |
| 2008/0175764 A1 | 7/2008 | Sako |
| 2008/0279710 A1 | 11/2008 | Zhamu et al. |
| 2008/0286191 A1 | 11/2008 | Stansberry et al. |
| 2008/0289813 A1 | 11/2008 | Gewily et al. |
| 2009/0035562 A1 | 2/2009 | Fukushima |
| 2009/0059474 A1 | 3/2009 | Zhamu et al. |
| 2009/0072448 A1 | 3/2009 | Shi et al. |
| 2009/0075120 A1 | 3/2009 | Cornie et al. |
| 2009/0130515 A1 | 5/2009 | Son et al. |
| 2009/0151847 A1 | 6/2009 | Zhamu et al. |
| 2009/0194205 A1 | 8/2009 | Loffler et al. |
| 2009/0295103 A1 | 12/2009 | Ebina et al. |
| 2009/0302552 A1 | 12/2009 | Leinfelder |
| 2010/0003530 A1 | 1/2010 | Ganguli et al. |
| 2010/0098956 A1 | 4/2010 | Sepeur et al. |
| 2010/0122821 A1 | 5/2010 | Corre et al. |
| 2010/0143690 A1 | 6/2010 | Romero et al. |
| 2010/0159357 A1 | 6/2010 | Otawa et al. |
| 2010/0163782 A1 | 7/2010 | Chang et al. |
| 2010/0196716 A1 | 8/2010 | Ohta et al. |
| 2010/0203340 A1 | 8/2010 | Ruoff et al. |
| 2010/0207055 A1 | 8/2010 | Ueno et al. |
| 2010/0266790 A1 | 10/2010 | Kusinski et al. |
| 2011/0027603 A1 | 2/2011 | Yaniv et al. |
| 2011/0033721 A1 | 2/2011 | Rohatgi |
| 2011/0045724 A1 | 2/2011 | Bahukudumbi |
| 2011/0157772 A1 | 6/2011 | Zhamu et al. |
| 2011/0200825 A1 | 8/2011 | Chakraborty et al. |
| 2011/0278506 A1 | 11/2011 | Toyokawa |
| 2012/0077020 A1 | 3/2012 | Muramastsu et al. |
| 2012/0107590 A1 | 5/2012 | Xu et al. |
| 2013/0001475 A1 | 1/2013 | Christ et al. |
| 2013/0045423 A1 | 2/2013 | Lim et al. |
| 2013/0096001 A1 | 4/2013 | Choi et al. |
| 2013/0260150 A1 | 10/2013 | Grivei et al. |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0147615 A1 | 5/2014 | Fernando et al. |
| 2014/0224466 A1 | 8/2014 | Lin et al. |
| 2014/0272592 A1 | 9/2014 | Thompkins et al. |
| 2015/0027567 A1 | 1/2015 | Shreve et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0218676 A1 | 8/2015 | Nakamura et al. |
| 2015/0267816 A1 | 9/2015 | Boskovski |
| 2016/0089648 A1 | 3/2016 | Xu et al. |
| 2016/0108703 A1 | 4/2016 | Xu et al. |
| 2016/0130519 A1 | 5/2016 | Lei et al. |
| 2016/0136928 A1 | 5/2016 | Zhao et al. |
| 2016/0138359 A1 | 5/2016 | Zhao et al. |
| 2016/0145965 A1 | 5/2016 | Zhao et al. |
| 2016/0145966 A1 | 5/2016 | Zhao et al. |
| 2016/0145967 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |
| 2017/0321069 A1 | 11/2017 | Zhao et al. |
| 2017/0342802 A1 | 11/2017 | Zhao et al. |

FOREIGN PATENT DOCUMENTS

| | | |
|---|---|---|
| CN | 2171734 Y | 7/1994 |
| CN | 2177841 Y | 9/1994 |
| CN | 1138079 A | 12/1996 |
| CN | 102301039 A | 12/2011 |
| CN | 102317233 A | 1/2012 |
| CN | 106660887 A | 5/2017 |
| DE | 102009022082 A1 | 11/2010 |
| EP | 0067252 A1 | 12/1982 |
| EP | 0539011 A1 | 4/1993 |
| EP | 1059133 A1 | 12/2000 |
| EP | 0747615 B1 | 10/2001 |
| EP | 2056004 A1 | 5/2009 |
| EP | 2130932 A1 | 12/2009 |
| EP | 2130932 A2 | 12/2009 |
| EP | 2213756 A1 | 8/2010 |
| EP | 2586963 A1 | 5/2013 |
| JP | S53134236 A | 11/1978 |
| JP | S5424910 A | 2/1979 |
| JP | S5491507 A | 7/1979 |
| JP | S58181713 A | 10/1983 |
| JP | S6131355 A | 2/1986 |
| JP | H0238365 A | 2/1990 |
| JP | H0616404 A | 1/1994 |
| JP | 2005282772 A | 10/2005 |
| JP | 2006298700 A | 11/2006 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011022031 A1 | 2/2011 |
| WO | 2011039531 A1 | 4/2011 |
| WO | 2012154183 A1 | 11/2012 |
| WO | 2014028149 A1 | 2/2014 |
| WO | 2015021627 A1 | 2/2015 |
| WO | 2016043876 A1 | 3/2016 |
| WO | 2016053510 A1 | 4/2016 |
| WO | 2016073117 A1 | 5/2016 |
| WO | 2016099611 A2 | 6/2016 |

OTHER PUBLICATIONS

Caturla et al. "Electroless Plating of Graphite with Copper and Nickel", Journal of the Electrochemical Society, The Electrochemical Society Inc., vol. 142, No. 12, Dec. 1, 1995, 7 pages.

Etter et al., "Aluminium carbide formation in interpenetrating graphite/aluminium composites", Materials Science and Engineering, Mar. 15, 2007, vol. 448, No. 1, pp. 1-6.

European Search Report for EP Application No. 15860822.4; dated Sep. 24, 2018. 9 pages.

European Search Report, European Application No. 15851570.0, dated Aug. 2, 2018, European Patent Office; European Search Report 18 pages.

European Search Report, European Application No. 15859233.7, dated Jun. 15, 2018, European Patent Office; European Search Report 12 pages.

European Search Report, European Application No. 15862719.0; PCT/US2015056886; dated Feb. 7, 2018, European Patent Office; EP Search Report7 pages.

European Search Report, European Application No. 15866529.9, dated Sep. 10, 2018, European Patent Office; European Search Report 10 pages.

(56) References Cited

OTHER PUBLICATIONS

Hutsch et al., "Innovative Metal-Graphite Composites as Thermally Conducting Materials", PM2010 World Congress—PM Functional Materials—Heat Sinks, 2010, 8 pages.

International Search Report and Written Opinion; International Application No. PCT/US2014/065389; International Filing Date: Nov. 13, 2014; dated Mar. 18, 2015; 15 pages.

International Search Report and Written Opinion; International Application No. PCT/US2015/056196; International Filing Date: Oct. 19, 2015; dated Jan. 26, 2016; 13 pages.

Krzesinska M. et al: "Elastic properties and electrical conductivity of mica/expanded graphite nanocomposites", Materials Chemistry and Physics, vol. 97, No. 1, May 10, 2006, pp. 173-181, XP024994936.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Miyamoto et al., "Development of New Composites; Ceramic Bonded Carbon", Transactions of JWRI, vol. 38, No. 2, 2009, pp. 57-61.

Moghadam et al, "Functional Metal Matrix Composites: Self-lubricating, Self-healing, and Nanocomposites—An Outlook", The Minerals, Metals & Materials Society, Apr. 5, 2014, 10 pages.

PCT International Search Report and Written Opinion; International Application No. PCT/US2015/054920; International Filing Date: Oct. 9, 2015; dated May 18, 2016; 12 pages.

Petitcorps et al. "Carbon Fibre Reinforced Copper Matrix Composites: Processing Routes and Properties", Key Engineering Materials, 1996, vols. 127-131, pp. 327-334.

Pohlmann et al., "Magnesium alloy-graphite composites with tailored heat conduction properties for hydrogen storage applications", International Journal of Hydrogen Energy, 35 (2010), pp. 12829-12836.

Prieto et al. "Fabrication and properties of graphite flakes/metal composites for thermal management applications", Scripta Materialia 59 (2008) 11-14.

Rashad et al "Effect of of Graphene Nanoplatelets addition on mechanical properties of pure aluminum using a semi-powder method", Materials International, Apr. 20, 2014, vol. 24, pp. 101-108.

Tikhomirov et al., "The chemical vapor infiltration of exfoliated graphite to produce carbon/carbon composites", Carbon, 49 (2011), pp. 147-153.

Yang et al., "Effect of tungsten addition on thermal conductivity of graphite/copper composites", Composites Part B: Engineering, May 31, 2013, vol. 55, pp. 1-4.

\* cited by examiner

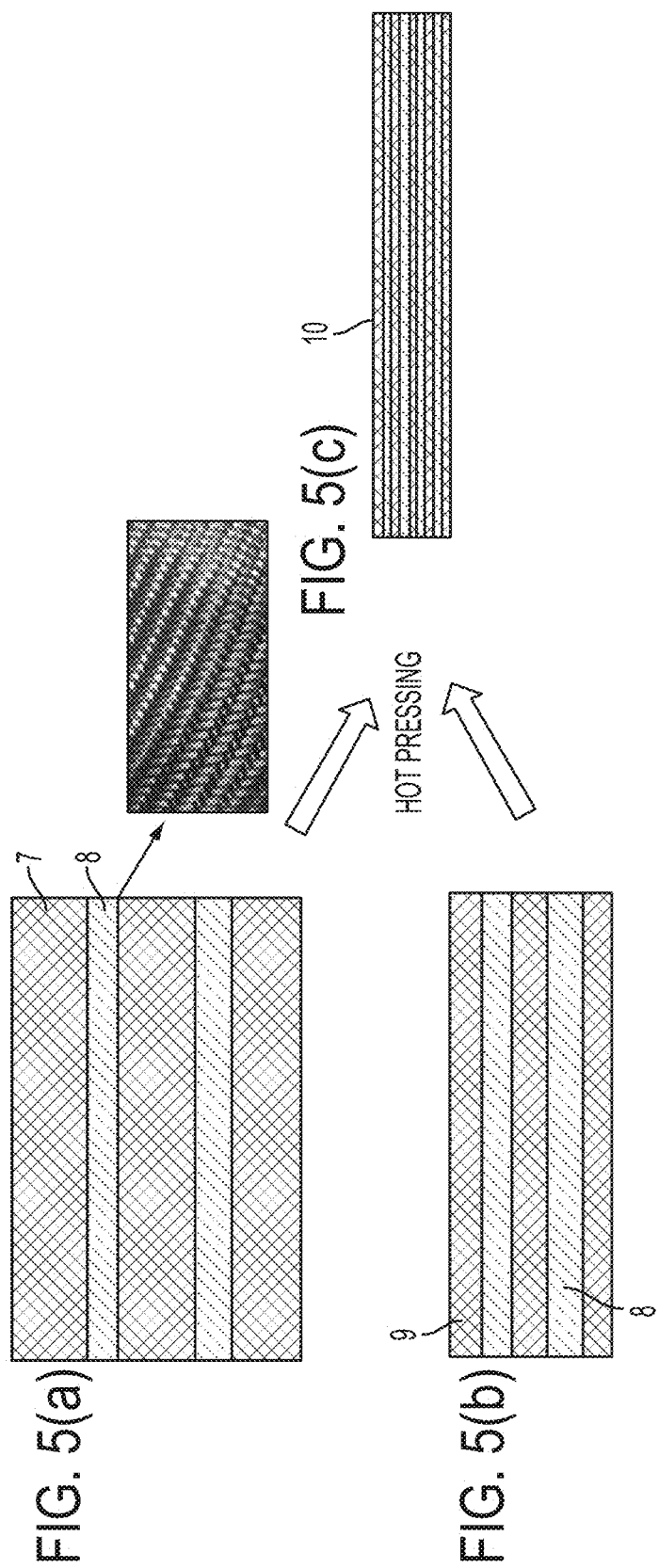

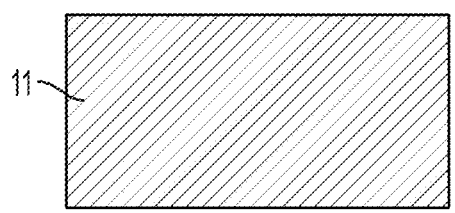
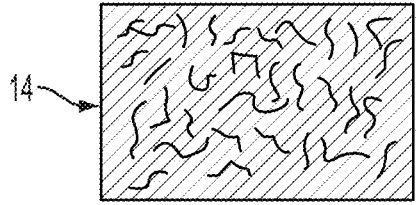
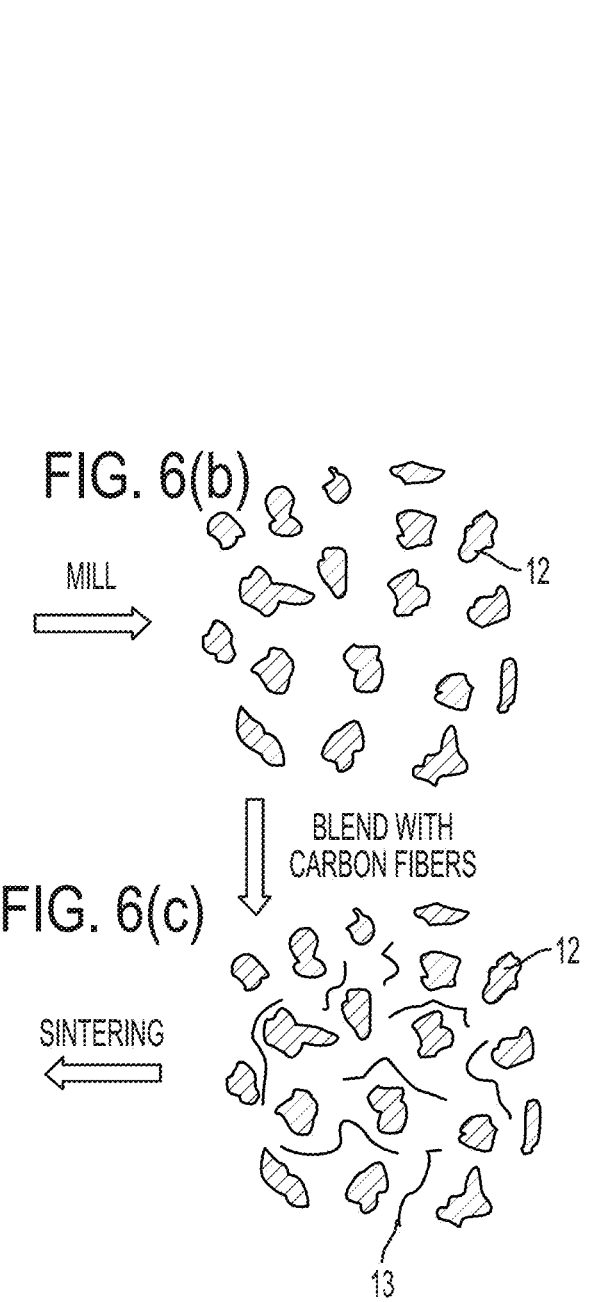

REINFORCED COMPOSITES, METHODS OF MANUFACTURE, AND ARTICLES THEREFROM

CROSS REFERENCE TO RELATED APPLICATIONS

This is a divisional application of U.S. application Ser. No. 14/540,177, filed on Nov. 13, 2014, the entire disclosure of which is incorporated herein by reference.

BACKGROUND

Graphite is an allotrope of carbon and has a layered, planar structure. In each layer, the carbon atoms are arranged in hexagonal arrays or networks through covalent bonds. Different carbon layers however are held together only by weak van der Waals forces.

Graphite has been used in a variety of applications including electronics, atomic energy, hot metal processing, coatings, aerospace and the like due to its excellent thermal and electrical conductivities, lightness, low friction, and high heat and corrosion resistances. However, graphite is intrinsically a brittle material with poor tolerance or impact resistance. The low strength limits its applications in machine parts with large or complex loading requirements. Thus, the industry is always receptive to new graphite materials having improved mechanical strength. It would be a further advantage if such materials also have improved high temperature corrosion resistance.

BRIEF DESCRIPTION

The above and other deficiencies in the prior art are overcome by, in an embodiment, a reinforced composite comprises: a reinforcing material comprising one or more of the following: a carbon fiber based reinforcing material; a metal based reinforcing material; a fiberglass based reinforcing material or a ceramic based reinforcing material; and a carbon composite; wherein the carbon composite comprises carbon and a binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium. An article comprising the reinforced composite is also disclosed.

A method for the manufacture of a reinforced composite comprises: alternately disposing a reinforcing material and a composition comprising a carbon and a binder in a mold to provide a reinforced composition; and compressing the reinforced composition at a temperature of about 350° C. to about 1400° C. and a pressure of about 500 psi to about 30,000 psi to form the reinforced composite.

In another embodiment, a method for the manufacture of a reinforced composite comprises: laminating a reinforcement layer on a carbon composite layer to provide a reinforced composition; and compressing the reinforced composition at a temperature of about 350° C. to about 1400° C. and a pressure of about 500 psi to about 30,000 psi to form the reinforced composite.

In yet another embodiment, a method for the manufacture of a reinforced composite comprises compressing a reinforced composition comprising a carbon composite and a reinforcing material at a temperature of about 350° C. to about 1400° C. and a pressure of about 500 psi to about 30,000 psi to form the reinforced composite.

BRIEF DESCRIPTION OF THE DRAWINGS

The following descriptions should not be considered limiting in any way. With reference to the accompanying drawings, like elements are numbered alike:

FIG. 5(a)-FIG. 5(c) illustrate a process of making a reinforced composite according to an embodiment of the disclosure, where FIG. 5(a) illustrates a reinforced composition comprising carbon fiber wave and a combination of graphite and a binder; FIG. 5(b) illustrates a laminate structure having alternating carbon composite and carbon fiber wave layers; and FIG. 5(c) illustrates a reinforced composite; and FIG. 6(a)-FIG. 6(d) illustrate a process of making a reinforced composite according to another embodiment of the disclosure, where FIG. 6(a) shows a carbon composite solid piece; FIG. 6(b) shows particles milled from the solid piece of FIG. 6(a); FIG. 6(c) shows a combination of the particles of FIG. 6(b) and carbon fibers; and FIG. 6(d) shows a reinforced composite.

DETAILED DESCRIPTION

Figure 1:
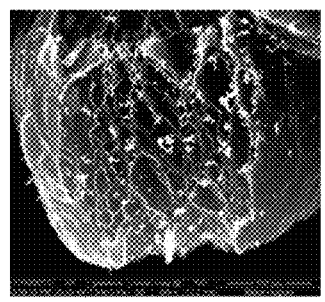
FIG. 1 is a scanning electron microscopic ("SEM") image of a composition containing expanded graphite and a micro- or nano-sized binder blended at room temperature and atmospheric pressure.

The inventors hereof have found that reinforced composites can be formed from graphite, binders, and reinforcing materials. The reinforced composites have excellent thermal and chemical resistance. Compared with traditional graphite materials, the reinforced composites have dramatically increased structural strength and toughness. Further, the reinforced composites can be tailored to have anisotropic or isotropic mechanical properties for use in uniaxial loading or multi-loading applications. In a further advantageous feature, the reinforced composites keep various superior properties of the graphite such as lightness, low coefficient of thermal expansion, excellent thermal shock, good thermal conductivity, high temperature resistance, lubricity, and the like.

The carbon fibers in the reinforced composites are not particularly limited and include carbon fiber filaments; carbon fiber rovings; carbon fiber yarns; carbon fiber tows; carbon fiber tapes; carbon fiber ribbons; carbon fiber meshes; carbon fiber tubes; carbon fiber films; carbon fiber braids; woven carbon fibers; non-woven carbon fibers; or carbon fiber mats. Combinations of the carbon fiber can be used.

Higher order fiber forms such as, for example, woven and non-woven carbon fibers, carbon fiber plies, and carbon fiber meshes can be formed from lower order carbon fibers such as, for example, carbon filaments, and carbon fiber tows. In an embodiment, the carbon fibers comprise fibers having at least one higher order fiber form. In another embodiment, the carbon fibers comprise a woven carbon fabric having a mesh size of about 14 to about 400, about 18 to about 200, or about 18 to about 40. Without being bound by theory, it is believed that when the woven carbon fiber fabrics have a mesh size within these ranges, a binder for the carbon composite may infiltrate into the woven carbon fibers thus integrating the carbon fibers together with the carbon composites.

Carbon fibers can be generated from precursors such as Rayon, polyacrylonitrile (PAN) and pitch. Rayon precursors are cellulosic materials. Carbon fibers from rayon precursors have a relatively low carbon content of about 20%, and tend to have a low strength and stiffness. In contrast, PAN precursors provide carbon fibers having a carbon content of about 55% and an excellent tensile strength due to a minimum of surface defects. Pitch precursors based on petroleum asphalt, coal tar, and polyvinyl chloride can also be used to produce carbon fibers. In an embodiment, the carbon fiber in the reinforced composite is generated from PAN precursors.

The most common types of glass fiber used in fiberglass is E-glass, which is alumino-borosilicate glass with less than 1% w/w alkali oxides, mainly used for glass-reinforced plastics. Other types of glass used are A-glass (Alkali-lime glass with little or no boron oxide), E-CR-glass (Electrical/Chemical Resistance; alumino-lime silicate with less than 1% w/w alkali oxides, with high acid resistance), C-glass (alkali-lime glass with high boron oxide content, used for glass staple fibers and insulation), D-glass (borosilicate named for its low Dielectric constant), R-glass (alumino silicate glass without MgO and CaO with high mechanical requirements as reinforcement), and S-glass (alumino silicate glass without CaO but with high MgO content with high tensile strength). In an embodiment, the glass fiber comprises glassfiber fabrics.

Metal fibers are manufactured fibers composed of metal, plastic-coated metal, metal-coated plastic, or a core completely covered by metal. Metal fibers include fibers of aluminum, bronze, steel, zinc, copper, nickel, gold, silver, or the like. Metal fiber may also be shaved from wire (steel wool), bundle drawn from larger diameter wire, cast from molten metal, or grown around a seed (often carbon). Metal based reinforcing materials can be in the form of fibers, yarns, meshes; fabrics, or the like.

Ceramic fiber based reinforcing materials include ceramic fiber wool such as alkaline earth silicate wool, alumino silicate wool, and polycrystalline wool; refractory ceramic fibers; and ceramic textiles.

Depending on the desired mechanical strength, the reinforced composites can include about 0.5 to about 50 wt. %, about 0.5 to about 40 wt %, about 1 to about 40 wt. %, or about 0.5 to about 10 wt. % or about 1 to about 8 wt. % of the carbon fiber, based on the total weight of the reinforced composites.

The carbon composite in the reinforced composites comprises carbon and a binder. The carbon can be graphite. As used herein, graphite includes one or more of natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$. Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Advantageously, the carbon composites comprise expanded graphite. Compared with other forms of the graphite, expanded graphite has high flexibility, high compression recovery, and larger anisotropy. The composites formed from expanded graphite and the binder can thus have excellent elasticity in addition to desirable mechanical strength.

In an embodiment, the carbon composites comprise carbon microstructures having interstitial spaces among the carbon microstructures; wherein the binder is disposed in at least some of the interstitial spaces; and wherein the carbon microstructures comprise unfilled voids within the carbon microstructures.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a micro- or nano-sized binder. For example, a binder can occupy about 10% to about 90% of the interstitial spaces among the carbon microstructures. In an embodiment, the binder does not penetrate the individual carbon microstructures and the voids within the carbon microstructures are unfilled, i.e., not filled with any binder. Thus the carbon layers within the carbon microstructures are not locked together by a binder. Through this mechanism, the flexibility of the carbon composites, particularly, expanded carbon composites can be preserved. In another embodiment, to achieve high strength, the voids within the carbon microstructures are filled with the binder. Methods to fill the voids within the carbon microstructures include vapor deposition.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bound by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: SiO$_2$; Si; B; or B$_2$O$_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as Inconel*, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composites can be micro- or nano-sized. In an embodiment, the binder has an average particle size of about 0.05 to about 50 microns, about 1 micron to about 40 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the microstructures to the binder layer. The first interface layer and the second interface layer can have the same or different compositions.

The interface layer comprises one or more of the following: a C-metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting SiO$_2$ or Si with the carbon of carbon microstructures, or B$_4$C formed by reacting B or B$_2$O$_3$ with the carbon of the carbon microstructures. When a combination of binder materials is used, the interface layer can comprise a combination of these carbides. The carbides can be salt-like carbides such as aluminum carbide, covalent carbides such as SiC and B$_4$C, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the carbon composites. The binder is present in an amount of about 5 wt. % to about 75 wt. % or about 20 wt. % to about 50 wt. %, based on the total weight of the carbon composites. In the carbon composites, the weight ratio of carbon relative to the binder is about 1:4 to about 20:1, or about 1:4 to about 4:1, or about 1:1 to about 4:1.

FIG. 1 is a SEM image of a composition containing expanded graphite and a binder blended at room temperature and atmospheric pressure. As shown in FIG. 1, the binder (white area) is only deposited on the surface of some of the expanded graphite worms.

Figure 2:
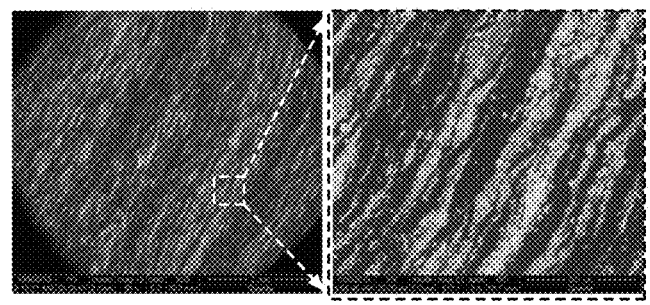
FIG. 2 is a SEM image of a carbon composite formed from expanded graphite and a micro- or nano-sized binder under high pressure and high temperature conditions according to one embodiment of the disclosure.

FIG. 2 is a SEM image of a carbon composite formed from expanded graphite and a binder under high pressure and high temperature conditions. As shown in FIG. 2, a binding phase (light area) is evenly distributed between the expanded graphite microstructures (dark area).

Figure 3:
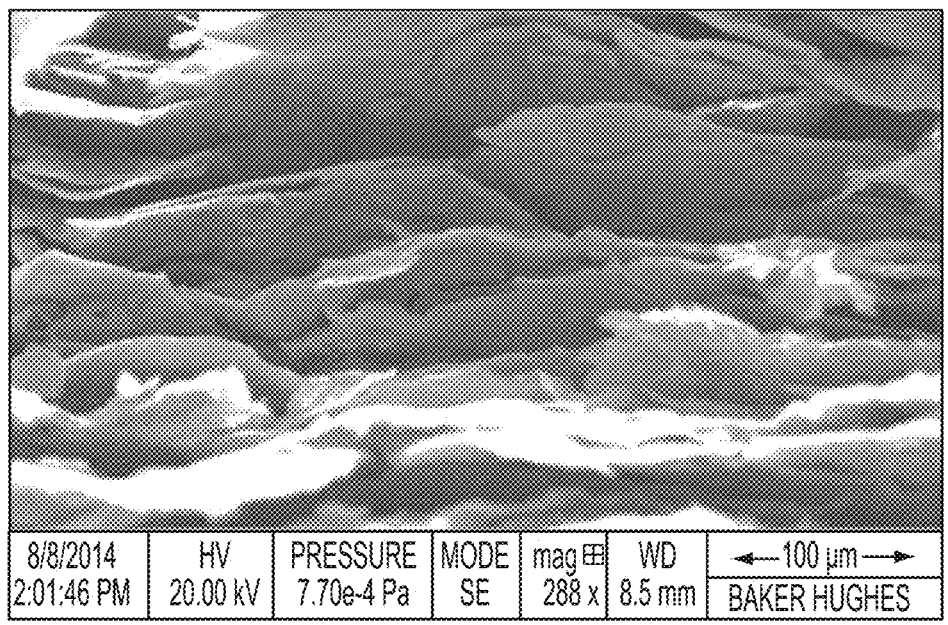
FIG. 3 is a SEM image of carbon microstructures according to another embodiment of the disclosure.
Figure 4:
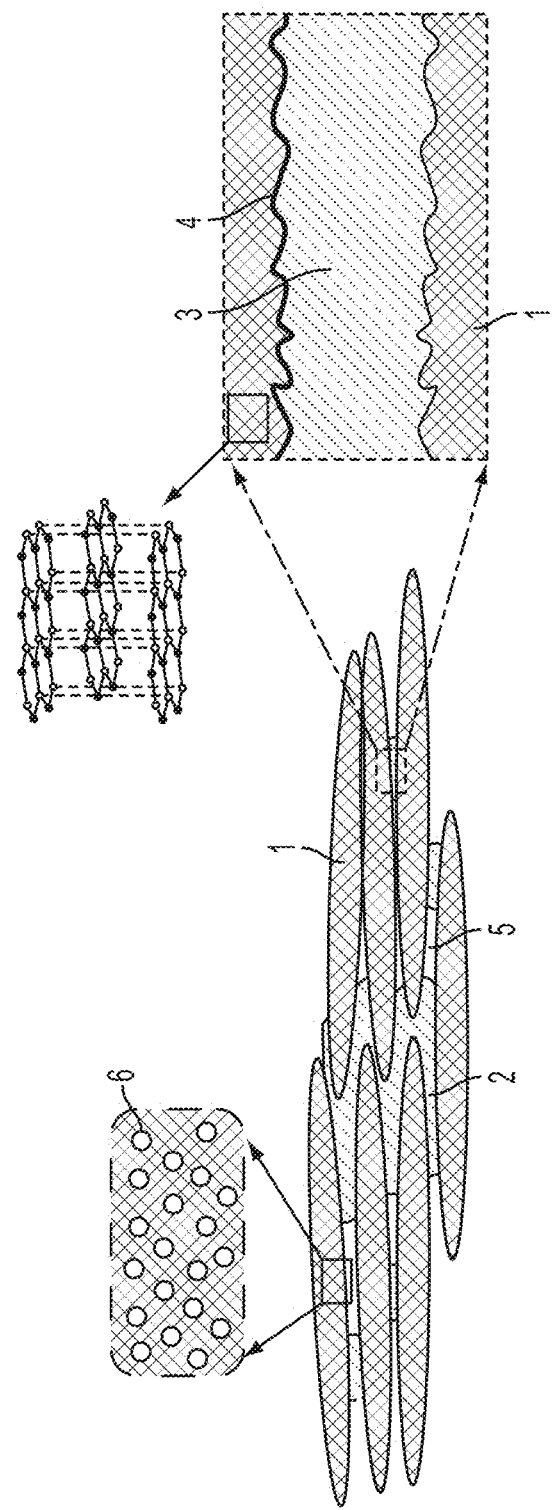
FIG. 4 is a schematic illustration of a carbon composite according to an embodiment of the disclosure.

A SEM image of carbon graphite microstructures is shown in FIG. 3. An embodiment of a carbon composite is illustrated in FIG. 4. As shown in FIG. 4, the composite comprises carbon microstructures 1 and binding phase 2 locking the carbon microstructures. The binding phase 2 comprises binder layer 3 and an optional interface layer 4 disposed between the binder layer and the carbon microstructures. The carbon composite contains interstitial space 5 among carbon microstructures 1. Within carbon microstructures, there are unfilled voids 6. Optionally, the voids can be filled.

The carbon composites can optionally comprise a filler. Exemplary filler includes carbon black, mica, clay, glass fiber, ceramic fibers, and ceramic hollow structures. Ceramic materials include SiC, $Si_3N_4$, $SiO_2$, BN, and the like. The filler can be present in an amount of about 0.5 to about 50 wt. %, about 0.5 to about 40 wt %, about 1 to about 40 wt. %, or about 0.5 to about 10 wt. % or about 1 to about 8%.

The reinforced composites include about 20 wt. % to about 99.5 wt. %, about 30 wt. % to about 99 wt. %, about 40 wt. % to about 99 wt. %, about 50 wt. % to about 99 wt. %, or about 92 wt. % to about 99 wt. % of the carbon composite, based on the total weight of the reinforced composites.

The forms of the reinforced composites are not particularly limited. In an embodiment, the reinforced composites have a layered structure and comprise a first layer (reinforcement layer) and a second layer (carbon composite layer) disposed on the first layer, wherein the first layer contains the reinforcing material disclosed herein and the second layer comprises the carbon composite disclosed herein. It is appreciated that the reinforced composites can have more than one reinforcement layer and more than one carbon composite layer. For example, the reinforced composites can include alternating reinforcement and carbon composite layers. The layered reinforced composite can have anisotropic properties when manufactured using uniaxial forces.

Optionally, the reinforcement layer further comprises a binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium. Without wishing to be bound by theory, it is believed that during the manufacturing process, the binder of the carbon composites may infiltrate into the reinforcement layer thus integrating the reinforcement layer together with the carbon composite layer.

The thickness of the reinforcement layer(s) and the carbon composite layer(s) are not particularly limited. In an embodiment, the thickness of a reinforcement layer relative to the thickness of a carbon composite layer is about 10:1 to about 1:10 or about 5:1 to about 1:5, or about 2:1 to about 1:2.

In another embodiment, the reinforced composites comprise a matrix of the carbon composites and a reinforcing material dispersed in the matrix. The reinforced composites of this embodiment can be made from a plurality of randomly oriented carbon composite particles. Accordingly, these composites can have isotropic properties. The weight of the carbon composite matrix relative to the weight of the reinforcing material is about 50:1 to about 1:50, about 35:1 to about 1:35, about 20:1 to about 1:20, or about 10:1 to about 1:10.

The reinforced composites can have any desired shape including a bar, block, sheet, tubular, cylindrical billet, toroid, powder, pellets, or other form that may be machined, formed or otherwise used to form useful articles of manufacture. The sizes or the dimensions of these forms are not particularly limited. Illustratively, the sheet has a thickness of about 10 µm to about 10 cm and a width of about 10 mm to about 2 m. The powder comprises particles having an average size of about 10 µm to about 1 cm. The pellets comprise particles having an average size of about 1 cm to about 5 cm.

The reinforced composites can be manufactured from the carbon such as graphite, the binder, and the reinforcing material directly. Alternatively, the reinforced composites can be manufactured from the carbon composites and the reinforcing material.

In an embodiment, a mold is alternately loaded with a reinforcing material and a combination comprising a carbon such as graphite and a binder to provide a reinforced composition. The reinforced composition is then compressed at a temperature of about 350° C. to about 1400° C. and a pressure of about 500 psi to about 30,000 psi to form the reinforced composite. An exemplary process is illustrated in FIG. 5. As shown in FIG. 5, a carbon fiber weave 8 and a combination 7 containing carbon such as graphite and a binder are alternately loaded in a mold (not shown) to provide a reinforced composition, which is then hot pressed to form the reinforced composite 10.

In the combination, the carbon such as graphite is present in an amount of about 20 wt. % to about 95 wt. %, about 20 wt. % to about 80 wt. %, or about 50 wt. % to about 80 wt. %, based on the total weight of the combination. The binder is present in an amount of about 5 wt. % to about 75 wt. % or about 20 wt. % to about 50 wt. %, based on the total weight of the combination. The graphite in the combination can be in the form of chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns. The density of the combination is about 0.01 to about 0.05 $g/cm^3$, about 0.01 to about 0.04 $g/cm^3$, about 0.01 to about 0.03 $g/cm^3$ or about 0.026 $g/cm^3$. The combination can be formed by blending the graphite and the micro- or nano-sized binder via any suitable methods known in the art. Examples of suitable methods include ball mixing, acoustic mixing, ribbon blending, vertical screw mixing, and V-blending. In another embodiment, the combination is made by vapor deposition. A "vapor deposition" process refers to a process of depositing materials on a substrate through the vapor phase. Vapor deposition processes include physical vapor deposition, chemical vapor deposition, atomic layer deposition, laser vapor deposition, and plasma-assisted vapor deposition. Examples of the binder precursors include triethylaluminum and nickel carbonyl. Different variations of physical deposition, chemical deposition, and plasma-assisted vapor deposition can be used. Exemplary deposition processes can include plasma assisted chemical vapor deposition, sputtering, ion beam deposition, laser ablation, or thermal evaporation. Through a vapor deposition process, the binder can at least partially fill the voids within the carbon microstructures.

In another embodiment, a method for the manufacture of a reinforced composite comprises: laminating a reinforcement layer on a carbon composite layer to provide a reinforced composition; and compressing the reinforced composition at a temperature of about 350° C. to about 1400° C.

and a pressure of about 500 psi to about 30,000 psi to form the reinforced composite. When the reinforced composites contain more than one reinforcement layer or more than one carbon composite layer, the laminating comprises laminating multiple alternating layers of a reinforcement layer and a carbon composite layer to form a reinforced composition. An exemplary process is illustrated in FIG. 5. As shown in FIG. 5, multiple alternating layers of a carbon fiber weave 9 and a carbon composite layer 8 are laminated to form a reinforced composition, which is then hot pressed or sintered to form the reinforced composite 10.

Alternatively, the reinforced composite can also be formed from carbon composites and reinforcing materials. The method includes compressing a reinforced composition comprising a carbon composite and a reinforcing material at a temperature of about 350° C. to about 1400° C. and a pressure of about 500 psi to about 30,000 psi to form the reinforced composite. The carbon composites used to make the reinforced composites can be in the form of a powder or pellets. An exemplary process is illustrated in FIG. 6. As shown in FIG. 6, a carbon composite solid piece 11 is milled to form carbon composite powder or particles 12, which are combined with carbon fibers 13 to form a reinforced composition. The reinforced composition can be hot pressed or sintered to form the reinforced composite 14.

The temperature for the processes to make reinforced composites is about 350° C. to about 1200° C., specifically about 800° C. to about 1200° C. In an embodiment, the temperature is about ±20° C. to about ±100° C. of the melting point of the binder, or about ±20° C. to about ±50° C. of the melting point of the binder. In another embodiment, the temperature is above the melting point of the binder, for example, about 20° C. to about 100° C. higher or about 20° C. to about 50° C. higher than the melting point of the binder.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. Optionally, the heating can also be conducted under an inert atmosphere, for example, under argon or nitrogen. In an embodiment, the reinforced compositions are heated in the presence of air.

The heating can be conducted at a pressure of about 500 psi to about 30,000 psi or about 1000 psi to about 5000 psi. The pressure can be a superatmospheric pressure or a subatmospheric pressure.

The obtained reinforced composites can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the reinforced composites can be directly molded to the useful shape by choosing the molds having the desired shape.

Sheet materials such as web, paper, strip, tape, foil, mat or the like can also be made via hot rolling. In an embodiment, the reinforced carbon composite sheets made by hot rolling can be further heated to allow the binder to effectively bind the carbon microstructures together.

Reinforced composite powder can be made by milling the reinforced composites, for example a solid piece, through shearing forces (cutting forces). It is noted that the reinforced composites should not be smashed. Otherwise, the voids within the carbon microstructures may be destroyed thus the carbon composites lose elasticity.

The processes to make the carbon composites are described in application Ser. No. 14/499,397, the content of which is incorporated herein by reference in its entirety.

One way to form the carbon composites is to compress a combination comprising carbon and a micro- or nano-sized binder to provide a green compact by cold pressing; and to compressing and heating the green compact thereby forming the carbon composites. In another embodiment, the combination can be pressed at room temperature to form a compact, and then the compact is heated at atmospheric pressure to form the carbon composite. These processes can be referred to as two-step processes. Alternatively, a combination comprising carbon and a micro- or nano-sized binder can be compressed and heated directly to form the carbon composites. The process can be referred to as a one-step process. The combination used in the one-step and the two-step processes can be the same as the combination used to make the reinforced composite.

Referring to the two-step process, cold pressing means that the combination comprising the graphite and the micro-sized or nano-sized binder is compressed at room temperature or at an elevated temperature as long as the binder does not significantly bond with the graphite microstructures. In an embodiment, greater than about 80 wt. %, greater than about 85 wt. %, greater than about 90 wt. %, greater than about 95 wt. %, or greater than about 99 wt. % of the microstructures are not bonded in the green compact. The pressure to form the green compact can be about 500 psi to about 10 ksi and the temperature can be about 20° C. to about 200° C. The reduction ratio at this stage, i.e., the volume of the green compact relative to the volume of the combination, is about 40% to about 80%. The density of the green compact is about 0.1 to about 5 g/cm$^3$, about 0.5 to about 3 g/cm$^3$, or about 0.5 to about 2 g/cm$^3$.

The green compact can be heated at a temperature of about 350° C. to about 1200° C., specifically about 800° C. to about 1200° C. to form the carbon composites. In an embodiment, the temperature is about ±20° C. to about ±100° C. of the melting point of the binder, or about ±20° C. to about ±50° C. of the melting point of the binder. In another embodiment, the temperature is above the melting point of the binder, for example, about 20° C. to about 100° C. higher or about 20° C. to about 50° C. higher than the melting point of the binder. When the temperature is higher, the binder becomes less viscose and flows better, and less pressure may be required in order for the binder to be evenly distributed in the voids between the carbon microstructures. However, if the temperature is too high, it may have detrimental effects to the instrument.

The heating can be conducted at a pressure of about 500 psi to about 30,000 psi or about 1000 psi to about 5000 psi. The pressure can be a superatmospheric pressure or a subatmospheric pressure. Without wishing to be bound by theory, it is believed that when a superatmospheric pressure is applied to the combination, the micro- or nano-sized binder is forced into the voids between carbon microstructures through infiltration. When a subatmospheric pressure is applied to the combination, the micro- or nano-sized binder can also be forced into the voids between the carbon microstructures by capillary forces.

In an embodiment, the desirable pressure to form the carbon composites is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the carbon composites can be applied. The temperature and the pressure can be held at the predetermined maximum temperature and the predetermined maximum pressure for about 5 minutes to about 120 minutes. In an embodiment, the predetermined maximum temperature is about ±20° C. to about ±100° C. of the melting point of the binder, or about ±20° C. to about ±50° C. of the melting point of the binder.

The reduction ratio at this stage, i.e. the volume of the carbon composite relative to the volume of the green compact, is about 10% to about 70% or about 20 to about 40%. The density of the carbon composite can be varied by controlling the degree of compression. The carbon composites have a density of about 0.5 to about 10 g/cm$^3$, about 1 to about 8 g/cm$^3$, about 1 to about 6 g/cm$^3$, about 2 to about 5 g/cm$^3$, about 3 to about 5 g/cm$^3$, or about 2 to about 4 g/cm$^3$.

Alternatively, also referring to a two-step process, the combination can be first pressed at room temperature and a pressure of about 500 psi to 30,000 psi to form a compact; the compact can be further heated at a temperature of about 350° C. to about 1200° C., specifically about 800° C. to about 1200° C. to make the carbon composite. In an embodiment, the temperature is about ±20° C. to about ±100° C. of the melting point of the binder, or about ±20° C. to about ±50° C. of the melting point of the binder. In another embodiment, the temperature can be about 20° C. to about 100° C. higher or about 20° C. to about 50° C. higher than the melting point of the binder. The heating can be conducted at atmospheric pressure.

In another embodiment, the carbon composite can be made from the combination of the graphite and the binder directly without making the green compact. The pressing and the heating can be carried out simultaneously. Suitable pressures and temperatures can be the same as discussed herein for the second step of the two-step processes to make the carbon composites.

Hot pressing is a process that applies temperature and pressure simultaneously. It can be used in both the one-step and the two-step processes to make carbon composites. Hot pressing can also be used in the processes to make the reinforced composites.

The reinforced composites have a number of advantageous properties for use in a wide variety of applications. In an especially advantageous feature, by forming carbon composites, the mechanical strength of the carbon such as graphite is greatly improved.

In addition to mechanical strength and elasticity, the reinforced composites can also have excellent thermal stability at high temperatures. The reinforced composites can have high thermal resistance with a range of operation temperatures from about −65° F. up to about 1200° F., specifically up to about 1100° F., and more specifically about 1000° F.

The reinforced composites can also have excellent chemical resistance at elevated temperatures. In an embodiment, the reinforced composites are chemically resistant to water, oil, brines, and acids with resistance rating from good to excellent. In an embodiment, the reinforced composites can be used continuously at high temperatures and high pressures, for example, about 68° F. to about 1200° F., or about 68° F. to about 1000° F., or about 68° F. to about 750° F. under wet conditions, including basic and acidic conditions. Thus, the reinforced composites resist swelling and degradation of properties when exposed to chemical agents (e.g., water, brine, hydrocarbons, acids such as HCl, solvents such as toluene, etc.), even at elevated temperatures of up to 200° F., and at elevated pressures (greater than atmospheric pressure) for prolonged periods.

The reinforced composites are medium hard to extra hard with harness from about 50 in SHORE A up to about 75 in SHORE D scale.

The reinforced composites are useful for preparing articles for a wide variety of applications including but are not limited to electronics, atomic energy, hot metal processing, coatings, aerospace, automotive, oil and gas, and marine applications. Thus, in an embodiment, an article comprises the reinforced composites. The carbon composites may be used to form all or a portion of an article.

The article can be a load-bearing element. Illustrative articles include a bearing; a bearing seat; a bushing; a piston; or a backup ring.

The article can be a downhole element. Illustrative articles include seals, seal bore protector, swabbing element protector, components of frac plug, bridge plug, compression packing elements (premier seal), expanding packing elements (ARC seal), O-rings, bonded seals, bullet seals, subsurface safety valve (SSSV) dynamic seals, SSSV flapper seals, V rings, back up rings, drill bit seals, or ESP seals. In an embodiment, the article is a packer, a seal, or an O-ring.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A reinforced composite comprising:
a first layer and a second layer; wherein the first layer comprises a reinforcing material and the second layer comprises a carbon composite;
the reinforcing material comprising one or more of the following: a carbon fiber based reinforcing material; a fiberglass based reinforcing material; a metal based reinforcing material; or a ceramic based reinforcing material; and the carbon composite comprises about 50 wt. % to about 80 wt. % of carbon and about 20 wt. % to about 50 wt. % of a binder, based on a total weight of the carbon composite, the carbon comprising one or more of the following: expanded graphite; expandable graphite; natural graphite; or synthetic graphite; and the binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium, wherein the reinforced composite comprises about 92 wt % to about 99 wt % of the carbon composite based on the total weight of the reinforced composite.

2. The reinforced composite of claim 1, wherein the thickness of the first layer relative to the thickness of the second layer is about 1:10 to about 10:1.

3. The reinforced composite of claim 1, wherein the reinforced composite comprises alternating first and second layers.

4. The reinforced composite of claim 1, wherein the carbon fiber based material comprises one or more of the following: a carbon fiber filament; a carbon fiber roving; a carbon fiber yarn; a carbon fiber tow; a carbon fiber tape; a carbon fiber ribbon; a carbon fiber mesh; a carbon fiber tube; a carbon fiber film; a carbon fiber braid; a woven carbon fiber; a non-woven carbon fiber; or a carbon fiber mat.

5. The reinforced composite of claim 1, wherein the carbon fiber comprises a woven carbon fiber having a mesh size of about 10 to about 400.

6. The reinforced composite of claim 1, wherein the metal based reinforcing material comprises one or more of the following: a metal fiber; a metal fiber yarn; a metal fiber mesh; or a metal fiber fabric; the fiberglass based reinforcing material comprises a fiberglass fabric; and the ceramic based reinforcing material comprises one or more of the following: a ceramic textile; ceramic fiber wool; or refractory ceramic fiber.

7. The reinforced composite of claim 1, wherein the carbon in the carbon composite comprises expanded graphite.

8. The reinforced composite of claim 1, wherein the carbon composite comprises carbon microstructures having interstitial spaces among the carbon microstructures; wherein the binder is disposed in at least some of the interstitial spaces; and wherein the carbon microstructures comprise filled voids within the carbon microstructures.

9. The reinforced composite of claim 8, wherein the carbon composite comprises at least two carbon microstructures and a binding phase disposed between the at least two carbon microstructures; and wherein the binding phase comprises the binder.

10. The reinforced composite of claim 9, wherein the binding phase comprises a binder layer and an interface layer bonding one of the at least two carbon microstructures to the binder layer; and wherein the interface layer comprises one or more of the following: a C-metal bond; a C—B bond; a C—Si bond; a C—O—Si bond; a C—O— metal bond; or a metal carbon solution.

11. The reinforced composite of claim 1, wherein the first layer further comprises a binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

12. The reinforced composite of claim 1, wherein the weight of the carbon composite relative to the weight of the reinforcing material is about 50:1 to about 1:50.

13. The reinforced composite of claim 1, wherein the reinforced composite is in the form of a bar, block, sheet, tubular, cylindrical billet, toroid, powder, or pellets.

14. An article comprising the reinforced composite of claim 1.

15. The article of claim 14, wherein the article is a load-bearing element.

16. The article of claim 14, wherein the article is a bearing; a bearing seat; a bushing; a piston; or a backup ring.

17. A method of manufacturing the reinforced composite of claim 1, the method comprising:
alternately disposing the reinforcing material and a composition comprising the carbon and the binder in a mold to provide a reinforced composition; and
compressing the reinforced composition at a temperature of about 350° C. to about 1400° C. and a pressure of about 500 psi to about 30,000 psi to form the reinforced composite, wherein the composition comprising the carbon and the binder forms the carbon composite in the second layer.

18. A method of manufacturing the reinforced composite of claim 1, the method comprising:
laminating a reinforcement layer on a carbon composite layer to provide a reinforced composition; and
compressing the reinforced composition at a temperature of about 350° C. to about 1400° C. and a pressure of about 500 psi to about 30,000 psi to form the reinforced composite;
wherein the reinforcement layer forms the first layer comprising the reinforcing material; and
the carbon composite layer forms the second layer comprising the carbon composite.

19. The method of claim 18, wherein the laminating comprises laminating multiple alternating layers of a reinforcement layer and a carbon composite layer to form the reinforced composition.

* * * * *